(12) United States Patent
Chen et al.

(10) Patent No.: US 8,708,854 B2
(45) Date of Patent: Apr. 29, 2014

(54) TORQUE TRANSMITTING SYSTEM

(75) Inventors: Li Chen, Shanghai (CN); Jian Yao, Shanghai (CN); Chunhao J. Lee, Houston, TX (US); Chi-Kuan Kao, Troy, MI (US); Farzad Samie, Franklin, MI (US); Yu Dong, Shanghai (CN); Chengliang Yin, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 13/358,847

(22) Filed: Jan. 26, 2012

(65) Prior Publication Data
US 2013/0196811 A1    Aug. 1, 2013

(51) Int. Cl.
*F16D 28/00* (2006.01)
*F16H 48/06* (2006.01)
*H02K 7/108* (2006.01)

(52) U.S. Cl.
USPC .......................... 475/149; 192/84.6; 192/48.2

(58) Field of Classification Search
CPC ....................................................... F16D 13/42
See application file for complete search history.

(56) References Cited

U.S. PATENT DOCUMENTS

| | | | | |
|---|---|---|---|---|
| 1,635,068 | A * | 7/1927 | Bing | 192/84.6 |
| 5,100,368 | A * | 3/1992 | Chien | 475/149 |
| 6,851,537 | B2 * | 2/2005 | Bowen | 192/84.6 |
| 2002/0000356 | A1 * | 1/2002 | Bjorkgard | 192/91 R |
| 2010/0263978 | A1 * | 10/2010 | Chen et al. | 192/3.52 |
| 2011/0291503 | A1 * | 12/2011 | Wolf et al. | 310/77 |

* cited by examiner

*Primary Examiner* — David D Le
*Assistant Examiner* — Mark Manley
(74) *Attorney, Agent, or Firm* — Quinn Law Group, PLLC

(57) ABSTRACT

A torque transmitting system includes a case, first and second clutch plates, and a ramp member that is selectively rotatable about an axis and that defines a ramp surface. The system also includes an electric motor having a motor housing, wherein the case is rotatable relative to the housing about the axis. The motor is configured to selectively apply torque to rotate the ramp member. The system additionally includes a roller element mounted with respect to the case and contacting the ramp surface. The ramp surface is configured such that, when the ramp member is rotated about the axis, the roller element exerts a reaction force on the ramp surface that urges the ramp member to move in a first axial direction and thereby transmit the reaction force to the clutch plates. A transmission assembly including the above described torque transmitting system is also disclosed.

7 Claims, 3 Drawing Sheets

TORQUE TRANSMITTING SYSTEM

TECHNICAL FIELD

The present disclosure relates to torque transmitting devices and systems that are engageable by electric actuation.

BACKGROUND

Automatic transmissions typically include an input member, an output member, a stationary member, a plurality of planetary gearsets, and a plurality of selectively engageable torque transmitting devices. The torque transmitting devices, i.e., clutches and brakes, selectively couple various members of the planetary gearsets to other members of the planetary gearsets or to the stationary member to achieve a plurality of different speed ratios between the input member and the output member.

In a typical automatic transmission, the torque transmitting devices are hydraulically actuated. The transmission includes a hydraulic circuit that includes a pump and solenoid valves that control the application of fluid pressure to each of the torque transmitting devices.

SUMMARY

A torque transmitting system includes a case, first and second clutch plates mounted with respect to the case and configured to be engaged via an application of force, and a ramp member. The ramp member is mounted with respect to the case, is selectively rotatable about an axis, and defines a ramp surface. The system also includes an electric motor having a motor housing, wherein the case is rotatable relative to the motor housing about the axis. The motor is configured to selectively apply torque to rotate the ramp member. The system additionally includes a roller element mounted with respect to the case and contacting the ramp surface. The ramp surface is configured such that, when the ramp member is rotated about the axis, the roller element exerts a reaction force on the ramp surface that urges the ramp member to move in a first axial direction and thereby transmit the reaction force to the clutch plates.

The torque transmitting system may also include a drive member that is operatively connected to the ramp member for rotation therewith about the axis. In such a case, the electric motor may be operatively connected to the drive member and configured to selectively apply torque thereto.

The electric motor may include a stator that is configured to rotate relative to the motor housing. The stator may be rotatably supported relative to the motor housing by a first bearing system. The electric motor may also include a rotor that is configured to rotate relative to each of the motor housing and the stator, and may be rotatably supported relative to each of the motor housing and the stator by a second bearing system.

The electric motor may additionally include a slip ring configured to transmit electrical power to the motor from a power source external to the torque transmitting system.

The torque transmitting system may additionally include an apply member operatively connected to the ramp member to receive the reaction force. In such a case, the apply member may be selectively axially movable to contact at least one of the clutch plates.

A transmission system including the above described torque transmitting system is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
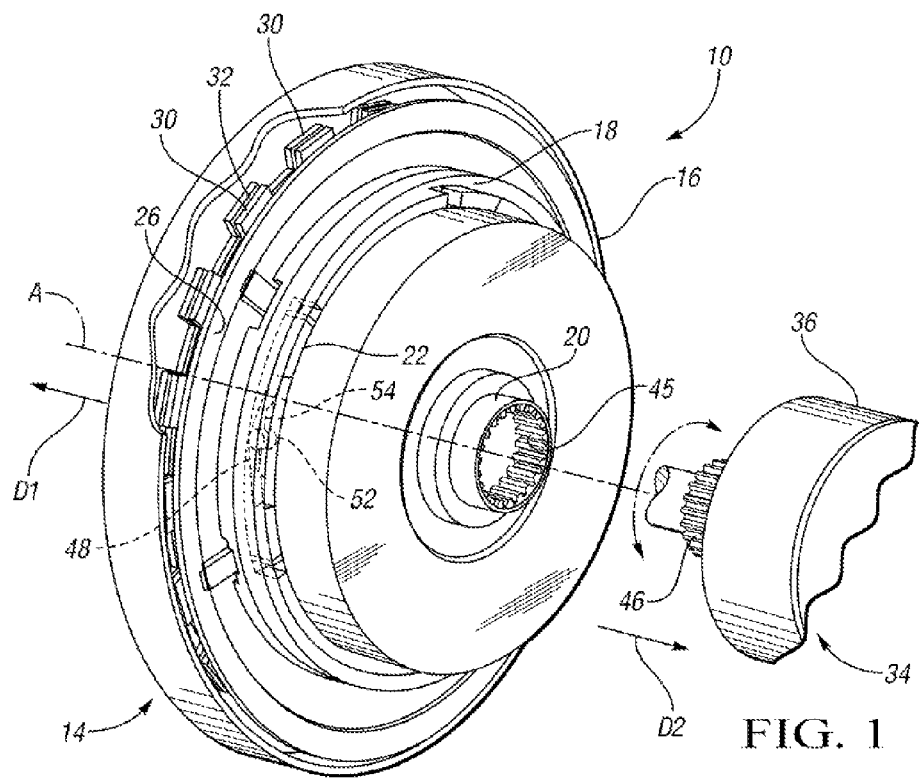
FIG. 1 is a schematic, partial perspective view of a torque transmitting system.

Referring to FIG. 1, a selectively engageable torque transmitting system 10 is schematically depicted. The torque transmitting system 10 includes a clutch assembly 14. The clutch assembly 14 includes an input gear member (e.g., input sun gear assembly 16), a drive member 18, a ramp member 22, an apply member (e.g., clutch piston or apply ring 26), a first plurality of clutch plates 30, which may be friction plates, and a second plurality of clutch plates 32, which may be reaction plates.

The torque transmitting system 10 also includes an electric motor 34. The electric motor 34 is mounted with respect to the clutch assembly 14 and is operative to urge the apply ring 26 against the clutch plates 30, 32 to engage the torque transmitting system 10 via an application of force, i.e., via a torque-to-thrust mechanism. When the clutch assembly 14 is used inside an automotive transmission, as will be described in detail below, the clutch plates 30 and the clutch plates 32 may be splined to individual rotatable transmission components that will become locked together when the clutch assembly 14 is engaged.

More specifically, the electric motor 34 is operatively connected to the drive member 18 and is configured to selectively cause rotation of the drive member by applying torque thereto. The electric motor 34 includes a motor housing 36. A rotating stator 38 and a rotor 40 are disposed inside the motor housing 36. As shown, the stator 38 is configured to rotate relative to the motor housing 36. Additionally, the stator is rotatably supported relative to the motor housing 36 via a first bearing system 42. The rotor 40 is rotatably supported relative to each of the motor housing 36 and the stator 38 via a second bearing system 44. The drive member 18 includes a hub 20 having an internal spline 45 that is configured for meshing engagement with a complementary external spline 46 of the rotor 40. Accordingly, the electric motor 34 is configured to selectively apply torque to rotate the drive member 18 such that rotation of the rotor 40 causes rotation of the drive member about axis A.

Figure 2:
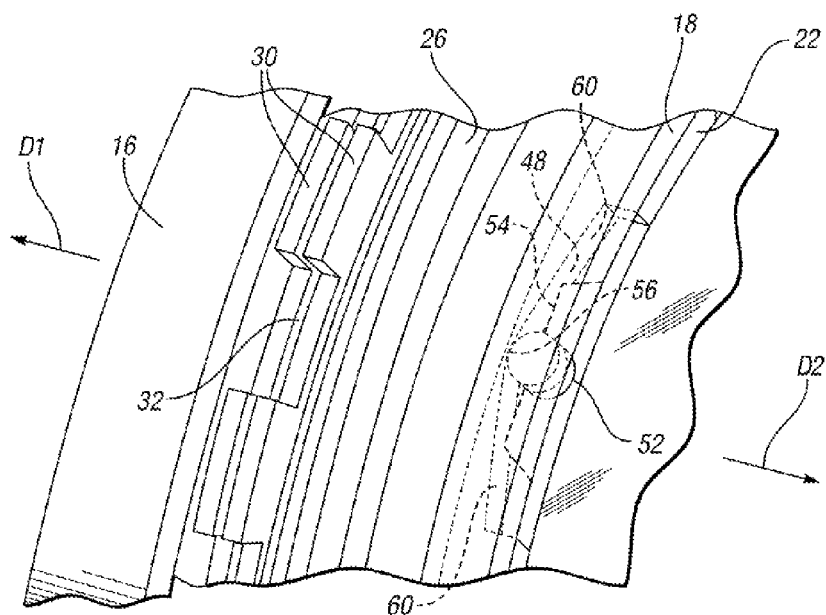
FIG. 2 is a schematic, perspective view of a portion of the torque transmitting system shown in FIG. 1.

The ramp member 22 is operatively connected to the drive member 18, such as via lugs 50 fitting together with complementary notches or pockets 51 (shown in FIG. 5), for rotation therewith about axis A. That is, the ramp member 22 is not rotatable with respect to the drive member 18, but is selectively axially movable with respect to the drive member in a first axial direction D1 and a second, opposite axial direction D2. Referring to FIGS. 1 and 2, the ramp member 22 defines at least one ramp surface 48 that faces the second axial direction D2.

A roller element 52 is rotatably mounted to the clutch assembly 14, is retained by a roller cage 54, and is in contact with the ramp surface 48. The roller element 52 may be retained in a roller cage (not shown), and the roller cage may in turn be installed into the clutch assembly 14 to rotate therewith about the axis A. The ramp surface 48 is characterized by portions 56, 60. Portion 56 of ramp surface 48 is axially disposed from portions 60 such that portion 56 is further in the second direction D2 than portions 60. In the embodiment depicted, two portions 60 extend on respective sides of portion 56.

When the clutch assembly 14 is disengaged, the ramp member 22 is positioned so that the roller element 52 is in contact with portion 56 of the ramp surface 48, as shown in FIGS. 1 and 2. A spring (not shown in FIG. 1 or 2) may be used to bias the ramp member 22 in the second axial direction D2, and, correspondingly, to bias the ramp surface 48 in the second axial direction D2 to maintain contact between the roller element 52 and the ramp surface 48.

Figure 3:
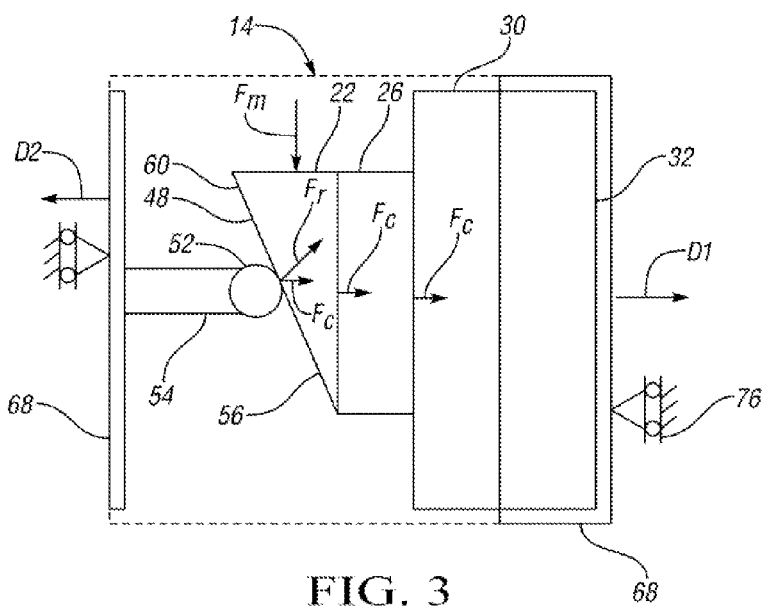
FIG. 3 is a schematic block diagram of a portion of the torque transmitting system shown in FIG. 1.

Referring to FIG. 3, the motor 34, acting via the rotor 40 and through the drive member 18, exerts a force $F_m$ on the ramp member 22. As the ramp member 22 rotates, the ramp surface 48 moves relative to the roller element such that the roller element 52 traverses the ramp surface 48 from portion 56 toward portion 60. The incline of the ramp surface 48 causes the surface 48 to exert a force on the roller element 52, which in turn exerts a reaction force $F_R$ on the ramp surface 48. The reaction force $F_R$ includes a component $F_C$ in the first axial direction D1, which urges the ramp member 22 in the first axial direction D1. Accordingly, the ramp 48 and the roller element 52 define a torque-to-thrust mechanism that converts the torque supplied by the electric motor 34 to thrust, which is applied to the clutch plates 30, 32 via the apply ring 26.

The ramp member 22 transfers the component $F_C$ of the reaction force $F_R$ to the apply ring 26, which in turn transfers the component $F_C$ to the clutch plates 30, 32, thereby engaging the clutch assembly 14. With the self-enforcement principle of a wedge mechanism, a small force $F_m$ can be enlarged to a large axial force $F_C$. The clutch assembly 14 can be engaged by rotating the ramp member 22 in either of two rotational directions, because the ramp surface 48 inclines or rises in the second axial direction D2 on two opposing sides of portion 56, as shown in FIG. 2.

It should be noted that, although only one ramp surface 48 and one roller element 52 are shown in FIGS. 1-4, one or more ramp surfaces 48 and rollers 52 may be employed within the scope of the claimed invention. In the embodiment depicted, the ramp member 22 defines three ramp surfaces 48 spaced about the ramp member 22, each being in engagement with a corresponding roller element on the input sun gear assembly 16.

Because the stator 38 is configured for rotation with respect to the motor housing 36, the electric motor 34 may be employed to selectively engage and disengage the clutch assembly 14 in situations when there is relative rotation between the clutch assembly and the electric motor about axis A. Such applications are particularly facilitated by the fact that the input sun gear assembly 16 may rotate relative to the motor housing 36 about the axis A. Thus, for example, the torque transmitting system 10 may be installed inside an automotive transmission. In such a situation, the motor housing 36 may be fixed inside the transmission and still permit the clutch assembly 14 to be employed as a rotating type of a clutch that is not fixed to any stationary member of the transmission.

Figure 4:
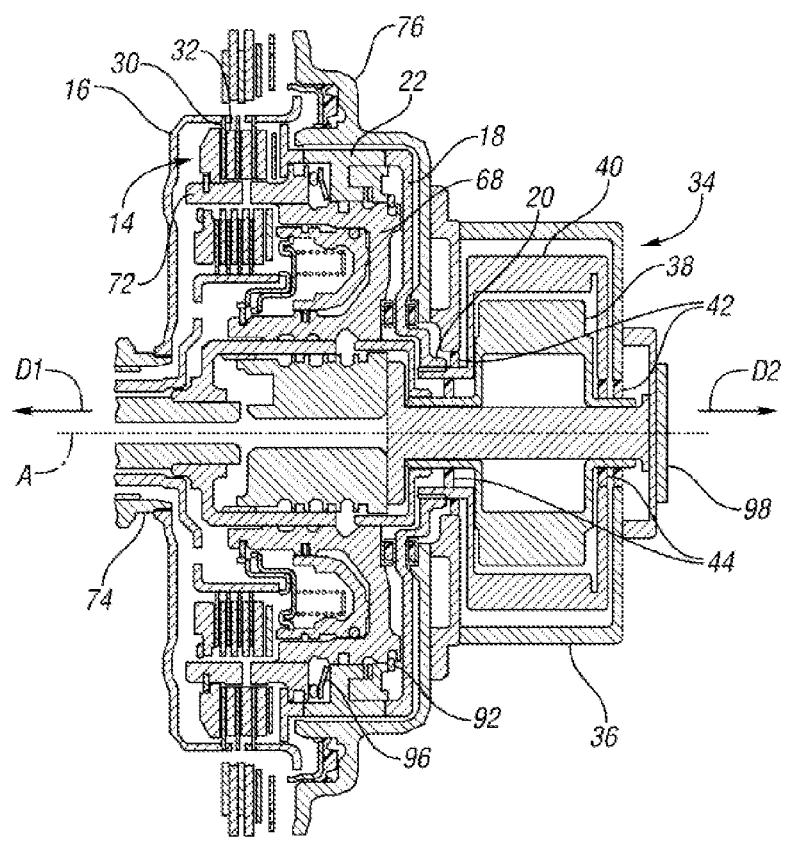
FIG. 4 is a schematic, sectional, side view of the torque transmitting system shown in FIG. 1.

Referring to FIG. 4, wherein like reference numbers refer to like components from FIGS. 1-3, the torque transmitting system 10 is shown operatively connected to a rotatable member 68 such that the roller element 52 is supported by the member 68. Member 68 is shown as a rotating clutch housing operatively connected to a member of a planetary gear set for rotation therewith about axis A. A hub 72 is mounted to the member 68 for rotation therewith. Clutch plates 32, which are shown as reaction plates, are splined to the hub 72 for rotation therewith, but are selectively axially movable with respect to the hub 72. Clutch plates 30, which are shown as friction plates, are splined to the input sun gear assembly 16 such that the clutch plates 30 are not rotatable with respect to the input sun gear assembly 16, yet are selectively axially movable relative thereto. The stator 38 of the motor 34 may be fixed to the rotatable member 68 for concurrent rotation therewith.

When the clutch assembly 14 is engaged, that is, when the apply ring 26 is urged in direction D2 to force plates 30 and 32 together, friction between the plates 30, 32 locks member 68 to the input sun gear assembly 16. In the embodiment depicted, the input sun gear assembly 16 is splined to an input sun gear 74 that is operatively connected to an input of the transmission. The input sun gear assembly 16 is also free to rotate relative to a stationary member 76, which may be a transmission case or a center support fixed to the transmission case. Accordingly, engagement of the clutch assembly 14 prevents rotation of the member 68 relative to the input sun gear 74. Additionally, as shown in FIG. 4, the electric motor 34 may be mounted to the stationary member 76, and thus itself be stationary relative to the clutch assembly 14.

Figure 5:
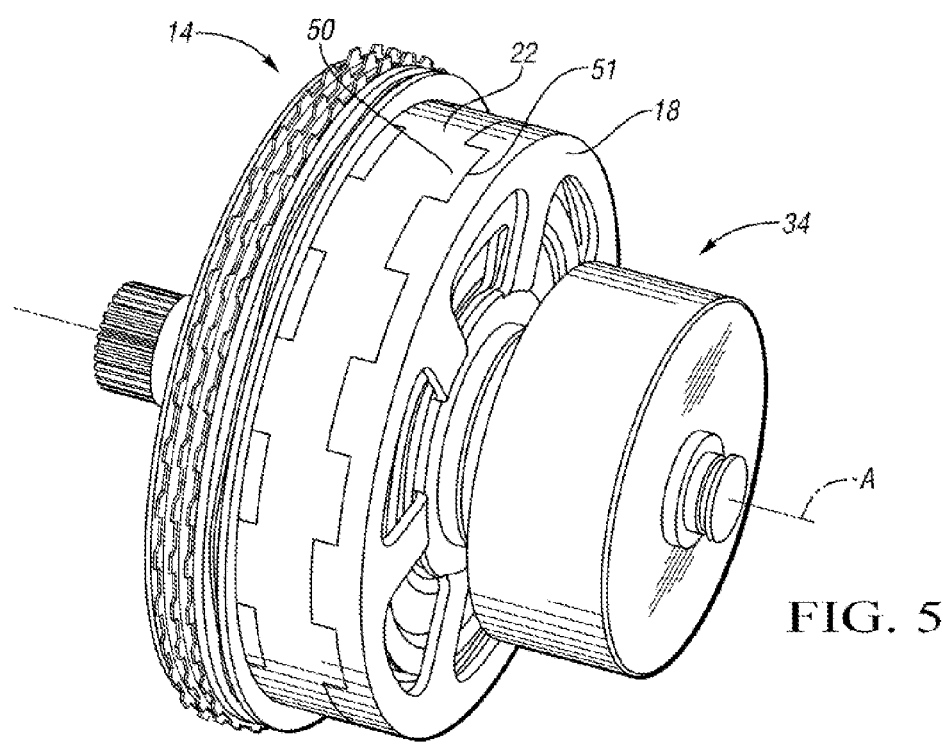
FIG. 5 is a schematic, assembled, perspective view of the torque transmitting system shown in FIG. 1.

Referring to FIG. 5, the interaction between the lugs 50 and the pockets 51 prevents relative rotation between the drive member 18 and the ramp member 22 about the axis A, while permitting axial movement of the ramp member 22 relative to drive member 18. As shown in FIG. 4, the clutch assembly 14 also includes a retention ring 92 configured as a positive stop for the ramp member 22, and a Belleville spring 96. The spring 96 biases the ramp member 22 in the first direction D1, i.e., toward the input sun gear assembly 16 and away from the clutch plates 30, 32, so that surface 48 is urged into contact with the roller element 52 being supported by the member 68.

Figure 6:
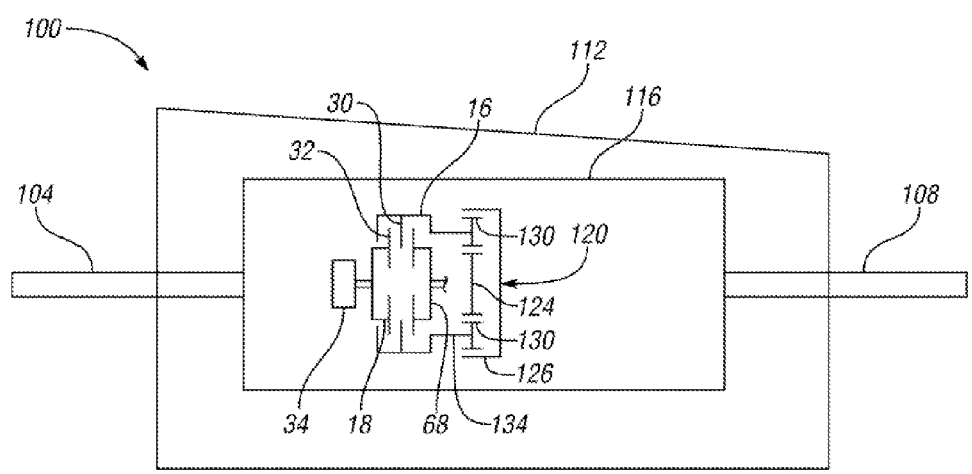
FIG. 6 is a schematic side view of an automotive transmission including the torque transmitting system of FIG. 1.

Referring to FIG. 6, wherein like reference numbers refer to like components from FIGS. 1-5, an automotive transmission 100 is schematically depicted. The transmission 100 includes an input member 104, an output member 108, and a stationary member, such as a transmission housing 112. The input member 104 and the output member 108 are operatively connected to gearing 116. Gearing 116 includes a plurality of planetary gearsets, only one of which is shown at 120 in FIG. 6. The transmission 100 further includes a plurality of torque transmitting devices, i.e., clutches and brakes. Such clutches and brakes are generally configured to selectively couple various members of the planetary gearsets to other members of the planetary gearsets or to the housing 112 to achieve a plurality of different speed ratios between the input member 104 and the output member 108, as understood by those skilled in the art. The above described torque transmitting devices of the transmission 100 include the clutch assembly 14.

The exemplary planetary gearset 120 includes a sun gear 124, a ring gear 126, a plurality of planetary pinion gears 130, and a planet carrier 134. Each of the planetary pinion gears 130 is rotatably mounted to the planet carrier 134 and is meshingly engaged with the ring gear 126 and the sun gear 124. The input sun gear assembly 16 of the clutch assembly 14 is rotatably mounted inside the transmission housing 112. The clutch plates 32 are splined to the member 68 for rotation therewith. Thus, when the motor 34 is activated, the clutch plates 30 splined to the input sun gear assembly 16, engage the clutch plates 32, thereby coupling the rotating member 68 to the input sun gear assembly 16 and facilitate activation of a particular speed ratio in the transmission 100.

As shown in FIG. 4, the electric motor 34 may also include a slip ring 98. Generally, a slip ring is configured to provide electrical contact in an electrical circuit between two elements that are in relative rotation relative to one another. Therefore, the slip ring 98 may be employed to transmit electrical power to the motor 34 from a power source (not shown) located externally to the torque transmitting system 10. Accordingly, the slip ring 98 may facilitate actuation of the electric motor 34 and selective engagement and disengagement of the clutch assembly 14 in the transmission 100 despite the stator 38 being able to rotate relative to the motor housing 36.

While the best modes for carrying out the invention have been described in detail, those familiar with the art to which this invention relates will recognize various alternative designs and embodiments for practicing the invention within the scope of the appended claims.

The invention claimed is:

1. A transmission assembly comprising: an input member; an output member; a stationary member; gearing operatively connected to the input member and the output member and configured to selectively provide a plurality of speed ratios between the input member and the output member, wherein the gearing includes a planetary gearset having first, second, and third members; and a torque transmitting system configured to rotate relative to the stationary member, the system including:

a clutch housing rotatably mounted with respect to the stationary member;

a first plurality of clutch plates operatively connected to the clutch housing;

a second plurality of clutch plates operatively connected to the first member of the planetary gearset;

a ramp member being selectively rotatable about an axis and defining a ramp surface, a drive member that is operatively connected to the ramp member for rotation therewith about the axis;

an electric motor having a motor housing fixed to the stationary member and a stator that is configured to rotate relative to the motor housing, wherein the clutch housing is rotatable relative to the motor housing about the axis and is fixed to the stator for concurrent rotation therewith, and the motor is operatively connected to the drive member and configured to selectively apply torque thereto; and a roller element mounted with respect to the clutch housing and contacting the ramp surface;

wherein the ramp surface is configured such that, when the ramp member is rotated about the axis, the roller element exerts a reaction force on the ramp surface that urges the ramp member to move in a first axial direction and thereby transmit the reaction force to the clutch plates.

2. The transmission system of claim 1, wherein the motor housing is connected to the stationary member.

3. The transmission system of claim 1, wherein the stator is rotatably supported relative to the motor housing by a first bearing system.

4. The transmission system of claim 3, wherein the electric motor includes a rotor that is configured to rotate relative to each of the motor housing and the stator, and is rotatably supported relative to each of the motor housing and the stator by a second bearing system.

5. The transmission system of claim 1, wherein the electric motor includes a slip ring configured to transmit electrical power to the motor from a power source external to the torque transmitting system.

6. The transmission system of claim 1, wherein the electric motor includes a slip ring configured to transmit electrical power to the motor from a power source external to the torque transmitting system.

7. The transmission system of claim 1, further comprising a spring biasing the ramp member in a second axial direction opposite the first axial direction.

* * * * *